July 24, 1956 W. R. G. DUANE, JR 2,756,418
MULTIPLEX SYSTEM EMPLOYING POLAR MODULATION
Filed Jan. 23, 1953
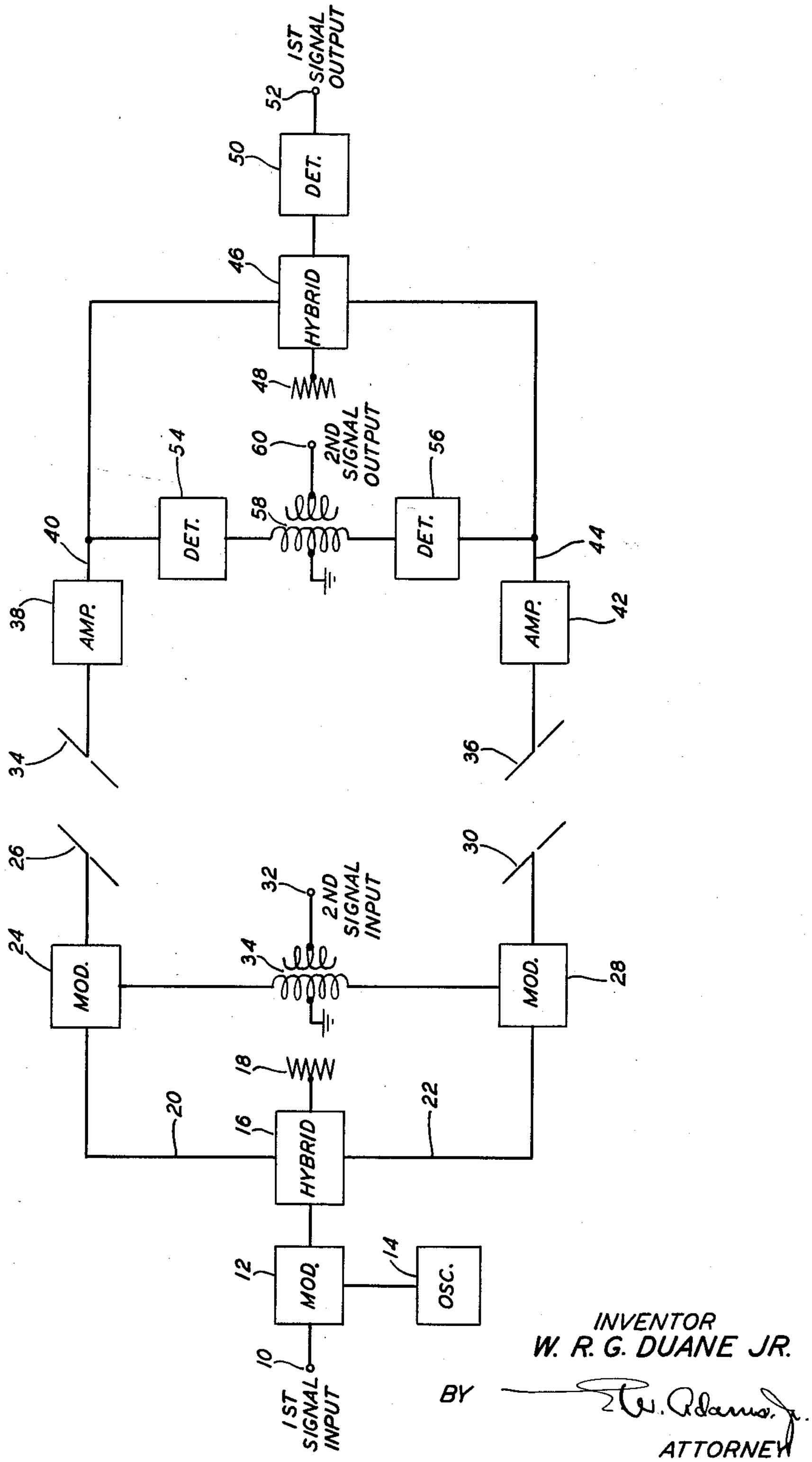
INVENTOR
W. R. G. DUANE JR.
BY [signature]
ATTORNEY

United States Patent Office 2,756,418

Patented July 24, 1956

2,756,418

MULTIPLEX SYSTEM EMPLOYING POLAR MODULATION

William R. G. Duane, Jr., Silver Spring, Md., assignor to Bell Telephone Laboratories, Incorporated, New York, N. Y., a corporation of New York Application January 23, 1953, Serial No. 332,963

3 Claims. (Cl. 343—200)

This invention relates to communication systems and more particularly to multiplex systems whereby additional message information may be transmitted over a single communication facility.

With the increasing use of radio communication and the corresponding restricted allocations of operating frequencies for various communication services it has become desirable to transmit as many different messages as possible over a communication facility occupying a particular wavelength assignment. In typical radio relay systems, for example, a plurality of message waves are transmitted over the same facility by use of time or frequency division multiplex techniques. In such systems a high utilization of the frequency band allocated thereto has been made. It may, however, be desirable to send additional message information over all or part of such a system. For example, in a radio relay system it may be desired to provide an order wire channel interconnecting the several radio repeater stations.

It is the object of the present invention to provide additional message channels for radio communication systems without increasing the band of frequencies required.

In accordance with the present invention this object is accomplished by employing the modulated carrier wave normally produced and transmitted by the system as the input wave to a modulator which effectively rotates the plane of polarization of the modulated carrier in accordance with variations in some quantity of a second message signal. This is accomplished by applying the modulated carrier wave to two branch circuits with a fixed energy level relationship. An antenna system is provided and arranged to radiate waves from one branch circuit with one plane of polarization and those from the second branch circuit with a different plane of polarization. The second message signal is applied to modulating means in the branch circuits to vary the respective levels of the energy therein differentially, thereby to rotate the plane of polarization of the total energy radiated by the antenna system.

At the receiver a similar antenna system provides outputs in separate branch circuits corresponding to the amounts of energy radiated with the two planes of polarization. These outputs are combined and detected to obtain an output signal corresponding to the modulation originally applied to the carrier wave and are differentially detected to obtain an output corresponding to the second message signal.

The above and other features of the invention will be described in detail in the following specification taken in connection with the drawing, the single figure of which is a single line block diagram of a representative multiplex system according to the invention.

As illustrated in the drawing, a first message signal is applied through an input terminal 10 to a modulator 12 to which is also applied the output of a carrier wave oscillator 14. Modulator 12 may be of any desired type and may produce either amplitude or angle modulation of the carrier in response to the message signal applied at terminal 10. By way of example, these elements may comprise the radio frequency elements of a microwave transmitter for a radio relay system and the input signal applied at terminal 10 may itself comprise a complex wave corresponding to a television video signal or to a plurality of lower frequency message signals multiplexed together on either a time or frequency division basis.

Normally the output of modulator 12 would be applied to an antenna for radiation to another station of the system. In accordance with the present invention, however, means are provided for rotating the plane of polarization of the modulated carrier wave appearing at the output of modulator 12 in accordance with variations in an additional message signal. For this purpose, the output of modulator 12 is applied to one branch of a hybrid circuit 16, a second conjugate branch of which is appropriately terminated as indicated at 18. Accordingly, the output wave from modulator 12 is divided into two waves which appear in fixed energy relationship and ordinarily at equal levels in the remaining branches 20 and 22 of the hybrid circuit.

Branch circuit 20 contains a modulator 24 and an antenna 26 shown in the drawing as a dipole oriented to radiate waves in a particular plane of polarization. Similarly, branch circuit 22 includes a modulator 28 and an antenna 30, the latter being arranged to radiate waves in a plane of polarization differing from that provided by antenna 26. As shown in the drawings, the planes of polarization of the waves radiated by antennas 26 and 30 are normal to one another, although this is not essential.

Each of modulators 24 and 28 may be of any convenient type capable of operating at the frequency of the carrier wave appearing at the output of modulator 12 and may, for example, comprise merely amplifier stages having means for varying the gain. A second input signal which may comprise a single message wave or a plurality of message waves multiplexed together is applied at terminal 32 and through a transformer 34 to modulators 24 and 28, connected in push-pull relationship. That is, the circuit is so arranged that a variation in the signal applied at terminal 32 causes an increase in the level of the energy in one of the branch circuits and a corresponding decrease in the level of the energy of the other branch circuit.

The net result of the differential variation of the energy levels in the two branch circuits may now be considered. First, it will be understood that the total amount of energy radiated from the two antennas 26 and 30 remains constant and is representative of the modulated output of modulator 12. Further, since antennas 26 and 30 radiate energy in different planes of polarization, the effect of differential variation in the levels of the energy applied to the antennas is effectively to rotate the plane of polarization of the resultant total energy radiated. Thus, it will be understood that the total energy radiated varies with variations in the first message signal applied at terminal 10, while the plane of polarization effectively rotates in accordance with variations in the second message signal applied at terminal 32.

Although separate dipole antennas are shown by way of illustration in the drawing, it will be understood that a single antenna capable of radiating energy simultaneously in two different planes of polarization may be employed. Antennas of this type are shown, for example, in the patent to M. Katzin 2,364,371, December 5, 1944, or in the patent to A. C. Beck et al. when used with a feed as shown in the application of A. P. King, Serial No. 260,137, filed December 6, 1951. In such instances, the outputs of modulators 24 and 28 serve as the two input connections for the antenna.

At the receiving end of the system an antenna system corresponding to that at the transmitter and shown in the drawing as comprising dipole antennas 34 and 36 is arranged to derive from the total energy radiated by the transmitter separate output components corresponding at any time to the respective amounts of energy radiated with the two different planes of polarization employed at the transmitter For this purpose, antenna 34 is oriented in the same way as dipole 26 at the transmitter and similarly antenna 36 is oriented in the same way as antenna 30 Effectively, therefore, antennas 34 and 36 resolve the total radiated wave into components corresponding to the two components present in branch circuits 20 and 22 at the transmitter. The output of antenna 34 is applied to an amplifier 38 and thence to a branch circuit 40, while the output of antenna 36 is similarly applied to an amplifier 42 and thence to a branch circuit 44. The relative energy levels of the waves in branch circuits 40 and 44 accordingly vary in the same way as those in the circuits feeding antennas 26 and 30 respectively at the transmitter. Similarly, the sum of the waves in the branch circuits 40 and 44 remains constant and is representative of the output of modulator 12 at the transmitter.

The waves in branch circuits 40 and 44 are combined in a hybrid circuit 46 corresponding to hybrid circuit 16 at the transmitter. The branch circuits 40 and 44 form two branches of the hybrid. A third branch is terminated at 48 and an output proportional to the sum of the waves in branch circuits 40 and 44 is obtained in the fourth branch for application to a detector 50. This detector acts to recover from the combined waves the first input signal which is made available at output terminal 52. Detector 50 corresponds to the receiver ordinarily employed in the radio relay system.

The second message signal is recovered from the waves appearing in branch circuits 40 and 44 by a process of differential or push-pull detection. For this purpose separate detectors 54 and 56 respectively are connected to branch circuits 40 and 44. The outputs of these detectors are connected together through the center tapped primary winding of a transformer 58, the secondary winding of which provides an output which is made available at output terminal 60. It will be recognized, therefore, that detectors 54 and 56 act essentially as a push-pull detector and provide an output which is proportional to the difference between the waves appearing in branches 40 and 44. Thus, the second message signal is transmitted over the system without necessitating any increase in band width and is recovered at the receiver.

What is claimed is:

1. In a communication system, a source of radiated energy, the total amount of which varies in accordance with variations in a first message signal and the plane of polarization of which varies in accordance with variations in a second message signal and a receiver for said energy arranged to recover said first and second message signals and comprising an antenna system providing separate outputs corresponding to components of said radiated energy in two different planes of polarization, means for combining the separate outputs of said antenna system, means for detecting the combined output to recover said first message signal, means for separately detecting the outputs from said antenna system and means for obtaining the difference between the outputs of said detecting means to recover said second message signal.

2. In a communication system, a source of carrier waves modulated by a first message signal, a pair of branch circuits, antenna means associated with each of said branch circuits to radiate waves from one of said circuits with a first plane of polarization and those from the other of said circuits with a second plane of polarization, means for applying said modulated carrier waves to said circuits at levels bearing a fixed relationship, means for differentially varying the levels of the waves in said circuits to rotate the plane of polarization of the total radiated energy in accordance with variations of a second message signal, receiving means for recovering said first and second message signals from the energy radiated by said antenna means comprising two branch circuits responsive respectively to energy radiated with said first and second planes of polarizations, means for combining energy recovered by said branch circuits to obtain a quantity proportional to the total energy radiated, means for detecting said quantity to recover said first message signal, means for independently detecting the energy in each of said branches to obtain separate quantities representative of said energies, and means for obtaining the difference between said quantities to recover said second message signal.

3. In a communication system, a transmitter radiating energy the total amount of which varies in accordance with variations in a first message signal and the plane of polarization of which rotates in accordance with variations in a second message signal and a receiver comprising antennas arranged to resolve said radiated energy into two components and to provide separate outputs proportional to said components, a branch circuit associated with each of said outputs, a hybrid circuit arranged to combine the waves in said branch circuits, means for detecting the combined waves to recover said first message signal and a push-pull detector receiving a first input from one of said branches and a second input from the other of said branches and providing an output proportional to said second message signal.

References Cited in the file of this patent

UNITED STATES PATENTS

| | | |
|---|---|---|
| Re. 22,884 | Kline | May 27, 1941 |
| 1,915,786 | Hammond | June 27, 1933 |
| 2,312,093 | Hammond | Feb. 23, 1943 |